(12) United States Patent
Hellmann

(10) Patent No.: US 8,105,709 B2
(45) Date of Patent: Jan. 31, 2012

(54) BATTERY MODULE

(75) Inventor: John V. Hellmann, Rochester Hills, MI (US)

(73) Assignee: Cobasys LLC, Orion, MI (US)

( * ) Notice: Subject to any disclaimer, the term of this patent is extended or adjusted under 35 U.S.C. 154(b) by 584 days.

(21) Appl. No.: 12/191,582

(22) Filed: Aug. 14, 2008

(65) Prior Publication Data

US 2009/0047574 A1 Feb. 19, 2009

Related U.S. Application Data

(60) Provisional application No. 60/955,705, filed on Aug. 14, 2007.

(51) Int. Cl.
*H01M 6/42* (2006.01)
*H01M 2/30* (2006.01)
(52) U.S. Cl. ...................... 429/121; 429/149
(58) Field of Classification Search .............. 429/121
See application file for complete search history.

(56) References Cited

U.S. PATENT DOCUMENTS

| | | | |
|---|---|---|---|
| 6,544,684 B2 | 4/2003 | Onishi et al. | |
| 6,761,993 B1 | 7/2004 | Karasawa et al. | |
| 6,939,642 B2 | 9/2005 | Asahina et al. | |
| 2002/0028375 A1* | 3/2002 | Morishita et al. | 429/120 |
| 2003/0044677 A1* | 3/2003 | Naruoka | 429/161 |
| 2006/0040173 A1* | 2/2006 | Shimamura et al. | 429/99 |

* cited by examiner

*Primary Examiner* — Patrick Ryan
*Assistant Examiner* — Brent Thomas
(74) *Attorney, Agent, or Firm* — Gifford, Krass, Sprinkle, Anderson & Citkowski, P.C.

(57) ABSTRACT

There is disclosed a battery module that includes a housing. At least one terminal is melt joined with the bus member of the housing sealing the terminal relative to the bus member and providing a conductive path to an interior of the battery module. The terminal may be melt joined in an ultrasonic joining operation or in a thermal insertion operation. A plurality of cells are disposed in the housing with each of the cells electrically coupled via bus bars integrated into a bus member. Each of the cells includes a plurality of positive and negative electrodes that are spaced by a separator. The negative electrode includes a substrate having tab meeting at a flange that is connected to an active material portion of the electrode. The positive electrode includes a substrate having a tab meeting at a flange that is connected to an active material portion of the electrode.

23 Claims, 9 Drawing Sheets

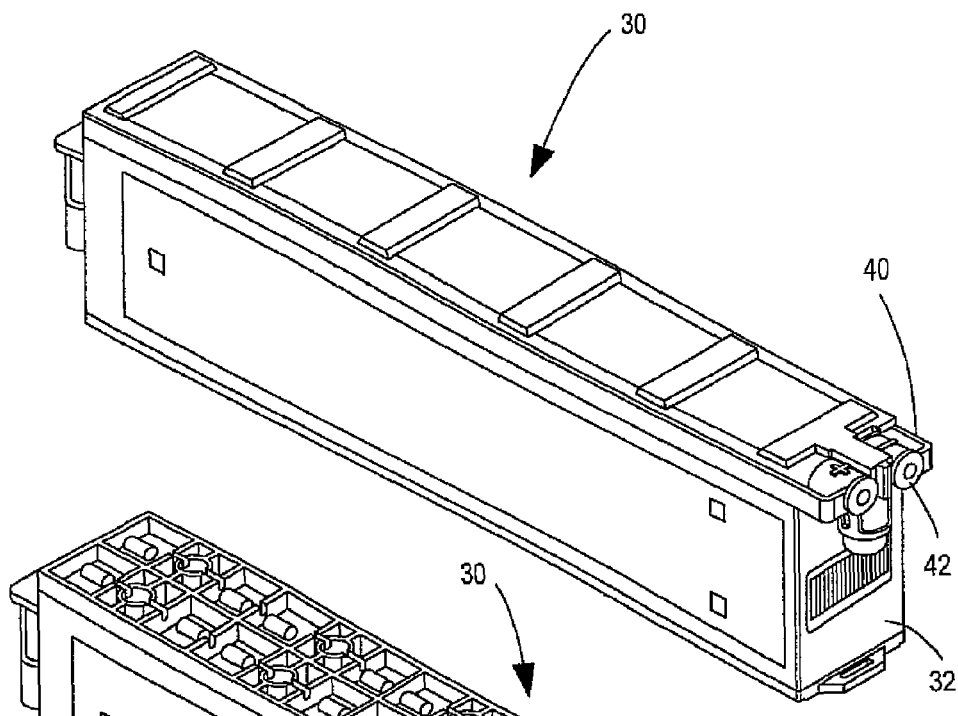
FIG. 2
FIG. 3
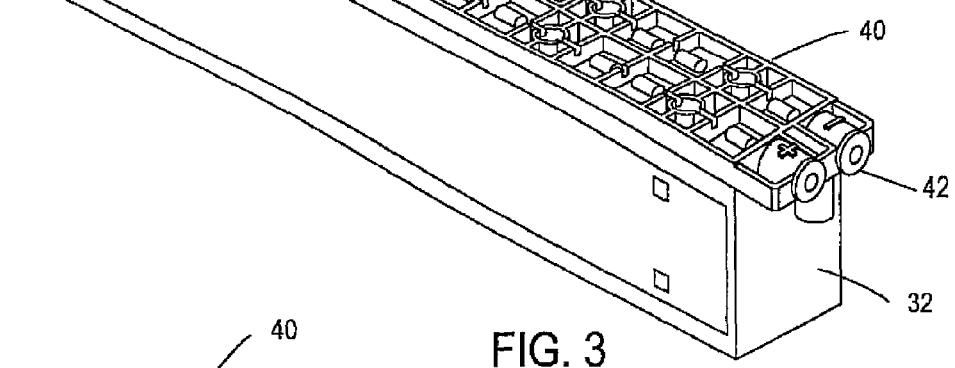
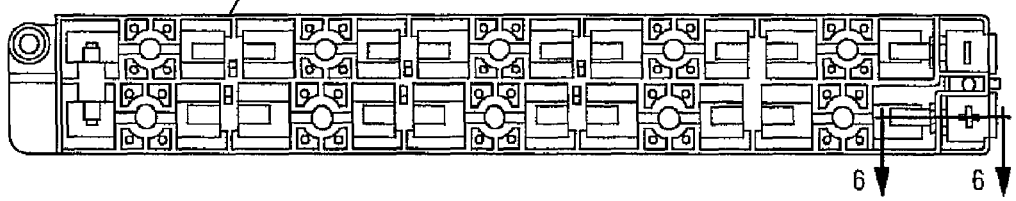
FIG. 4

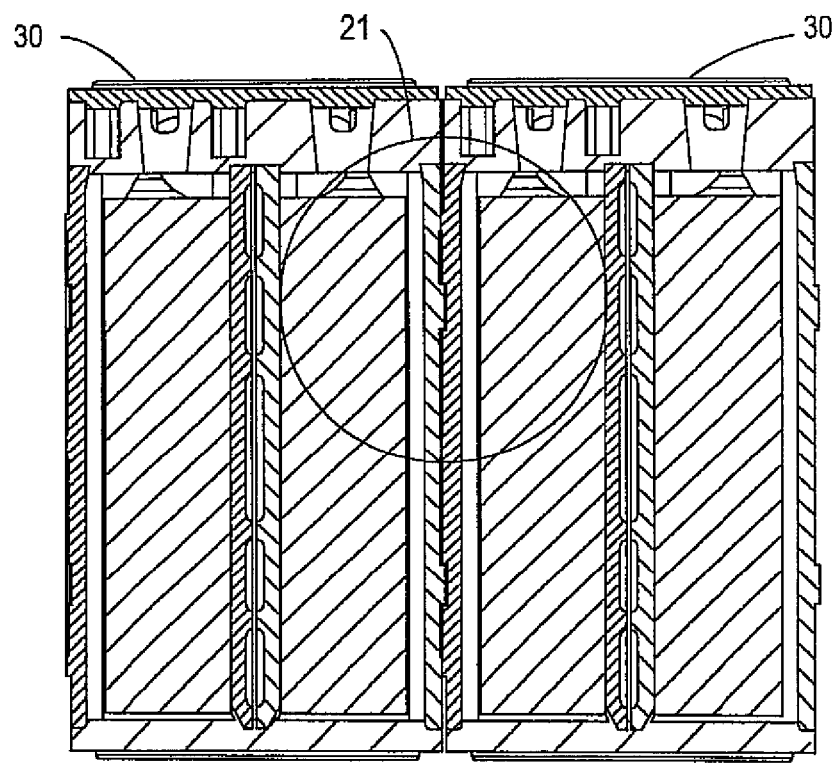
FIG. 20
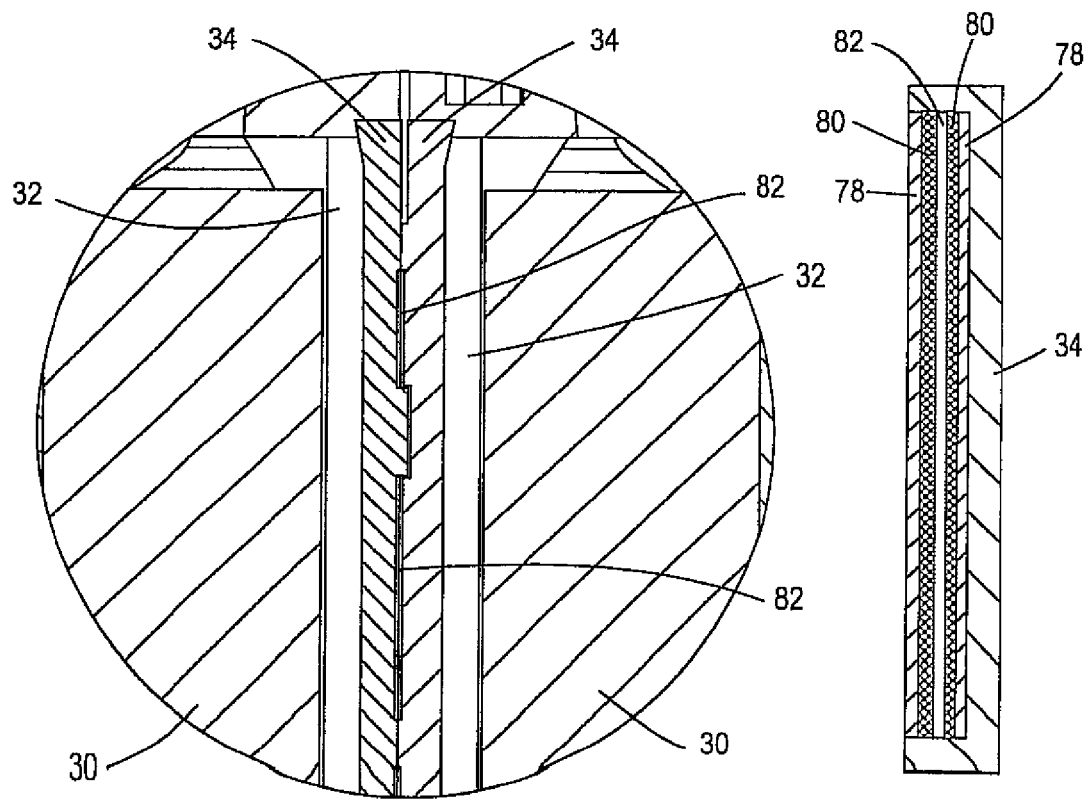
FIG. 21
FIG. 22

BATTERY MODULE

REFERENCE TO RELATED APPLICATIONS

This application claims priority of U.S. Provisional Patent Application Ser. No. 60/955,705 filed Aug. 14, 2007, the contents of which are incorporated herein by reference in its entirety.

FIELD OF THE INVENTION

The invention relates to battery modules.

BACKGROUND OF THE INVENTION

Battery modules may include a structure having a housing in which alternately stacked positive and negative electrode plates are positioned within the housing. Current prior art positive and negative electrodes may exhibit voltage drops and have uneven current distributions across the electrode. Therefore, there is a need in the art for an improved positive and negative electrode that minimizes voltage drops and improves the current distribution across the electrodes.

Additionally, prior art battery modules may include terminals that are attached to the housing and interface with a bus bar or other system associated with the electrodes. The terminals attached to the housing of prior art battery modules add a significant cost to the battery module due to the cost of the terminals themselves as well as the requirements of joining the terminals to the bus bar. Additionally, terminals associated with battery modules should be sealed relative to the housing preventing the discharge of gases from the battery module, as well as preventing introduction of gases exterior of the battery module into the battery module. Therefore, there is a need in the art for an improved battery module having terminals that are cost effective and provide a sealed interface with a housing.

SUMMARY OF THE INVENTION

In one aspect, there is disclosed a battery module that includes a housing. At least one terminal is melt joined with the housing sealing the terminal relative to the housing and providing a conductive path to an interior of the battery module. The terminal may be melt joined in an ultrasonic joining operation or in a thermal insertion operation.

In another aspect, there is disclosed a battery module including a housing. A plurality of cells are disposed in the housing with each of the cells electrically coupled to a bus member. Each of the cells includes a plurality of positive and negative electrodes that are spaced by a separator. The negative electrode includes a substrate having a tab meeting at a flange that is connected to an active material portion of the electrode.

In another aspect, there is disclosed a battery module including a housing. A plurality of cells are disposed in the housing with each of the cells electrically coupled to a bus member. Each of the cells includes a plurality of positive and negative electrodes spaced by a separator. The positive electrode includes a substrate having a tab meeting at a flange that is connected to an active material portion of the electrode.

BRIEF DESCRIPTION OF THE DRAWINGS

FIG. 2 is an assembled perspective view of a battery module;
FIG. 3 is a partially assembled perspective view of a battery module with the top removed displaying the bus members;
FIG. 4 is a top view of the battery module of FIG. 3;
FIG. 20 is a sectional view of adjacent battery modules detailing the spacing material;
FIG. 21 is a detailed view of the spacing material shown in FIG. 20
FIG. 22 is a sectional view of the side of the housing of the battery module taken along the line 22-22 of FIG. 1.

DETAILED DESCRIPTION OF THE PREFERRED EMBODIMENTS

Figure 1:
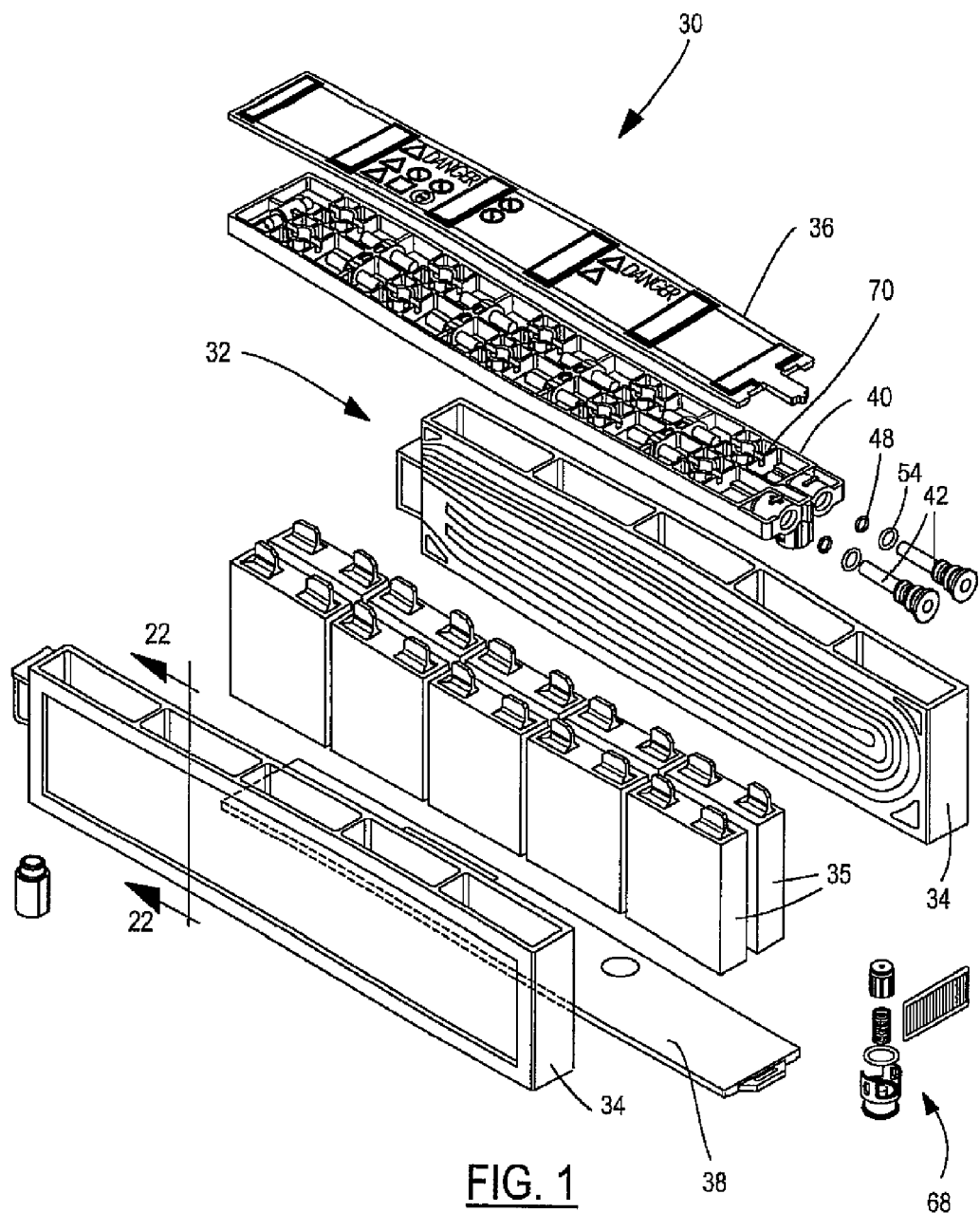
FIG. 1 is an exploded perspective view of a battery module.
Figure 5:
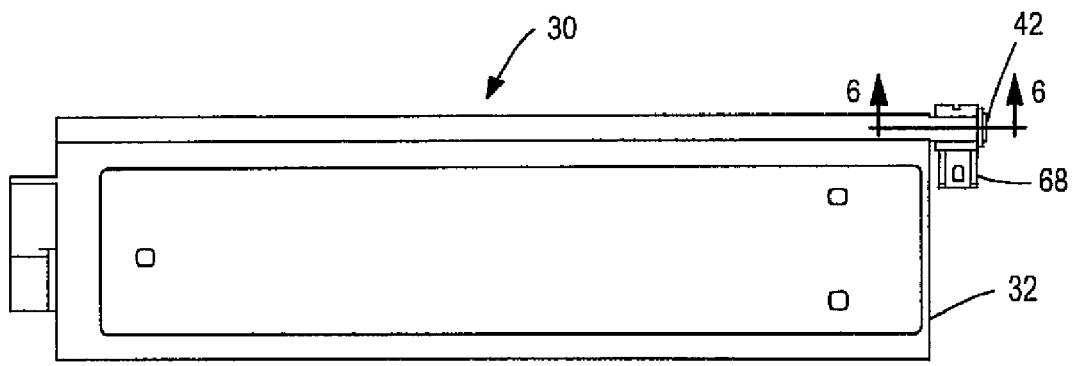
FIG. 5 is a side view of the battery module.

Referring to FIG. 1, there is shown a battery module 30. The battery module 30 includes a housing 32 that is a vessel having sides 34, a top 36, a bottom 38, and a bus member 40 adapted to receive a plurality of connections that link the cells 35 of the battery module 30. Additionally, at least one terminal 42 is melt joined with the bus member 40 sealing the terminal 42 relative to the bus member 40 and providing a conductive path to an interior of the battery module 30.

In one aspect, the terminal 42 may be melt joined utilizing an ultrasonic joining operation. In another aspect, the terminal 42 may be melt joined in a thermal insertion operation. Both of the operations will be described in more detail below.

Figure 6:
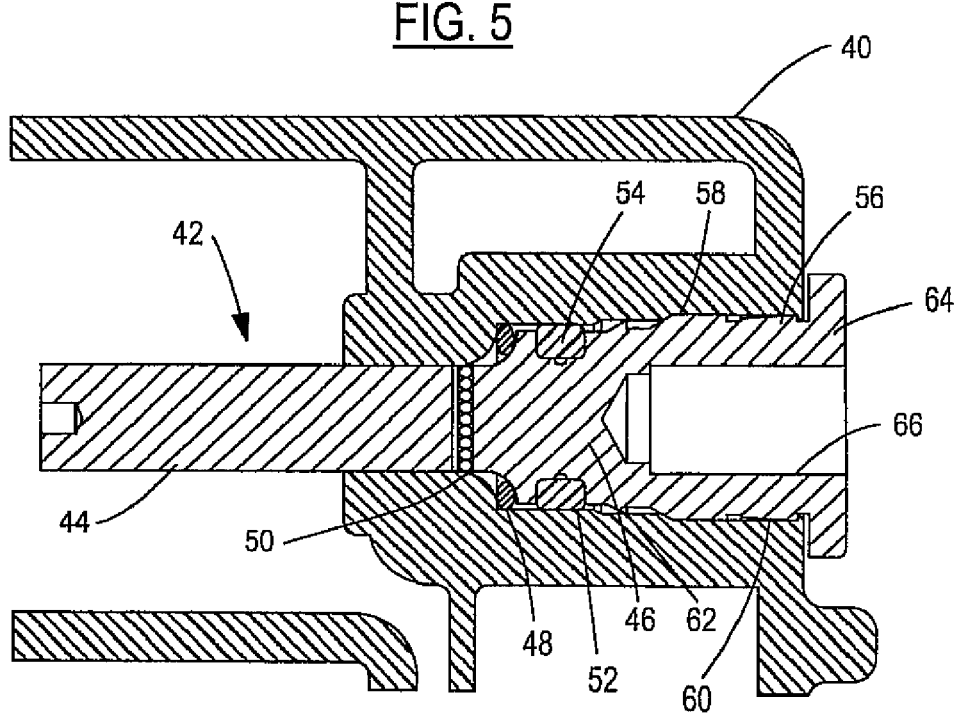
FIG. 6 is a partial sectional view taken along the lines 6-6 of FIGS. 4 and 5.
Figure 7:
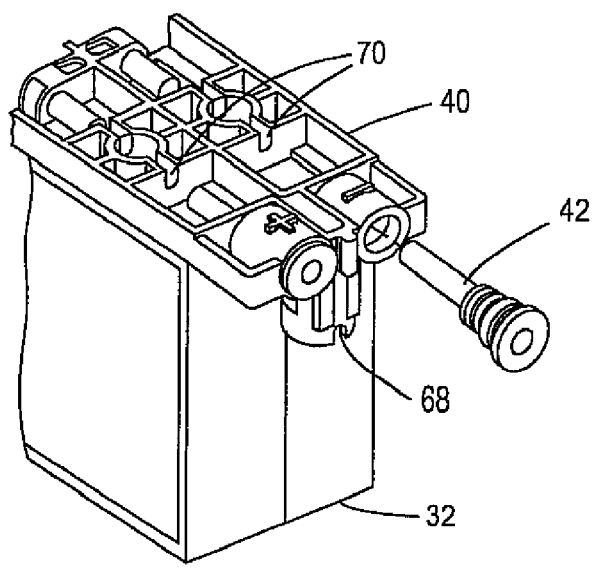
FIG. 7 is a partial end view of a battery module with a terminal positioned relative to a negative portion of the bus member.
Figure 8:
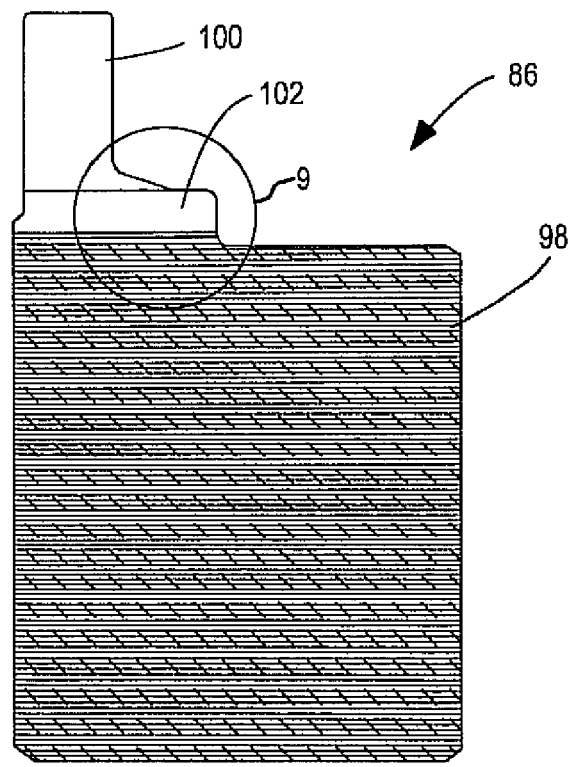
FIG. 8 is a side view of a negative electrode of the battery module.
Figure 9:
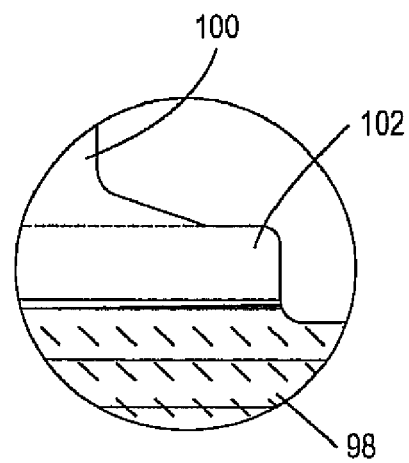
FIG. 9 is a detailed view of the flange and substrate of the negative electrode of FIG. 8.
Figure 10:
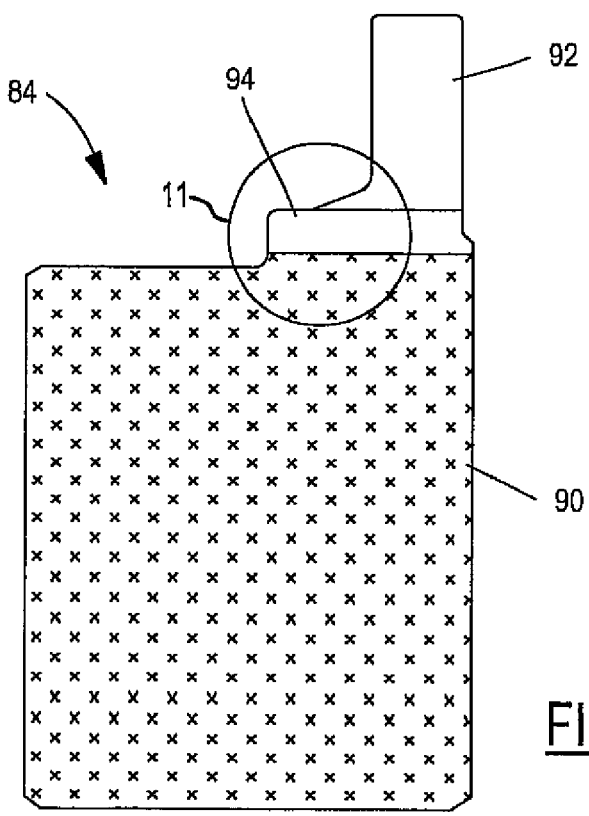
FIG. 10 is a side view of a positive electrode of the battery module.
Figure 11:
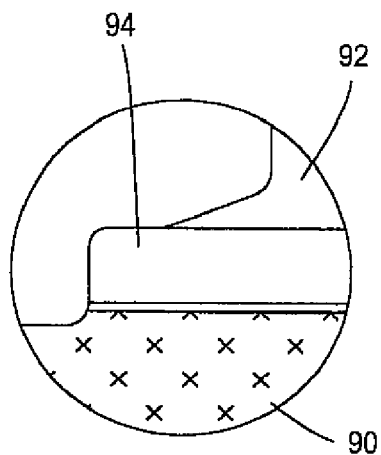
FIG. 11 is a detailed view of the flange and substrate of the positive electrode of FIG. 10.
Figure 12:
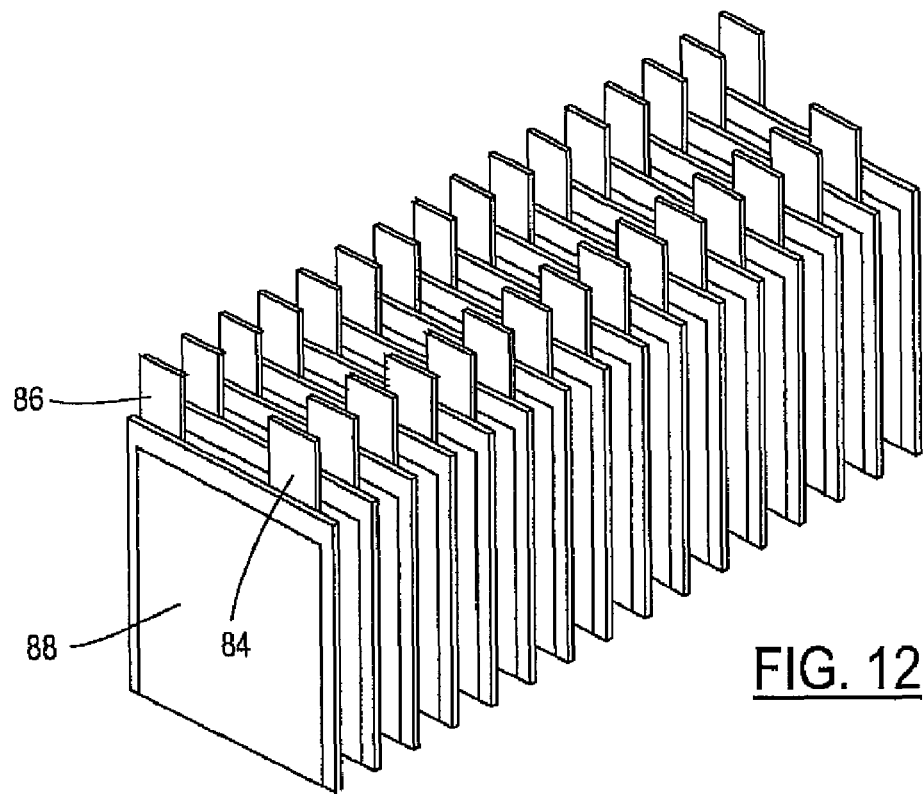
FIG. 12 is a perspective view of a plurality of positive and negative electrodes stacked relative to each other with a separator disposed between the positive and negative electrodes.
Figures 13, 14, 15:
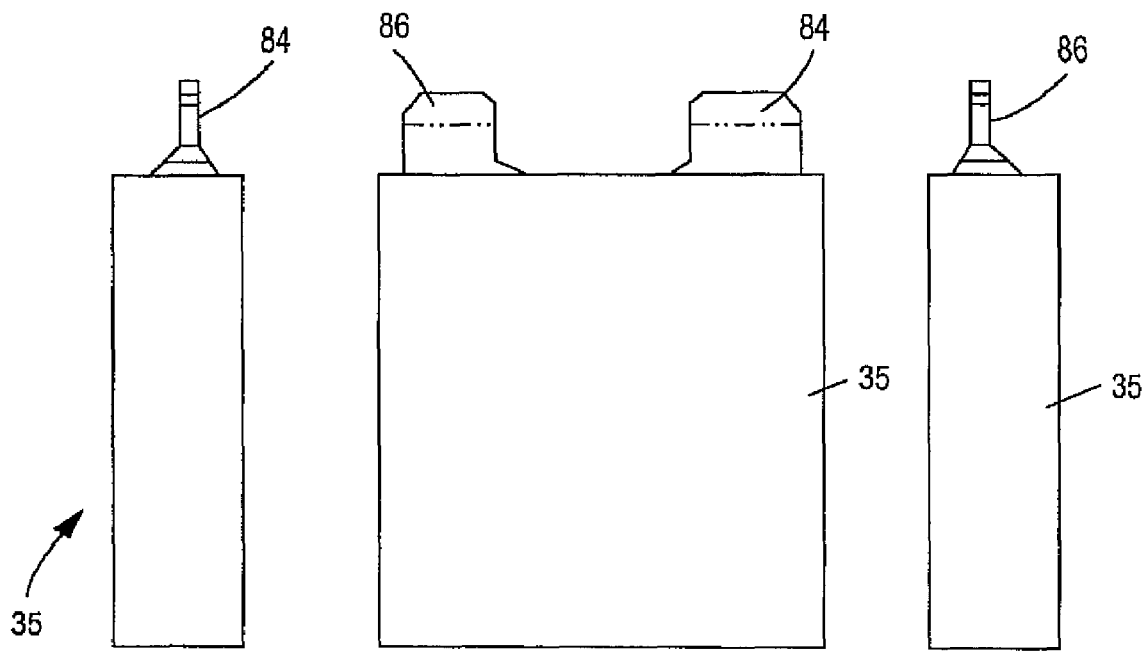
FIG. 13 is an end view of the plurality of electrodes showing the positive electrodes.
FIG. 14 is a front view of the plurality of positive and negative electrodes.
FIG. 15 is an end view of the plurality of positive and negative electrodes detailing the negative electrode.

As stated above, at least one terminal 42 is melt joined with the bus member 40 sealing the terminal 42 relative to the bus member 40. In one aspect and as best seen in FIG. 6, the at least one terminal 42 includes a shank 44 that is adapted to interact with the bus member 40 associated with the housing 32. The shank 44 extends longitudinally to a transition portion 46. The shank 44 may include a first o-ring 48 disposed thereon for sealing relative to the bus member 40 when the terminal 42 is joined to the bus member 40. The shank 44 may also include a viscous bonding layer 50 disposed thereon to provide a vapor barrier between the terminal 42 and bus member 40. In one aspect, the transition portion 46 may include a channel 52 that receives a second O-ring 54 for sealing the terminal 42 relative to the bus member 40.

In another aspect, the terminal 42 may include a terminal portion 56 that extends longitudinally from the transition portion 46. The terminal portion 56 may include an outer surface 58 having knurled formations 60 providing an anti-rotation when joined to the housing 32. Additionally, the outer surface 58 of the terminal portion 56 may also include anti-pullout formations 62 formed thereon to prevent the terminal 42 from being pulled out from the bus member 40 after a joining operation. For example, the anti-pullout formations 62 may be ridges that enable the outer surface 58 of the terminal portion 56 to grip or attach to the inner surface of the bus member 40.

The terminal portion 56 ends at a connection surface 64 that is adapted to connect to an external load. The connection surface 64 may include a threaded portion 66 that allows the external load to engage the connection surface 64 in a screw type engagement. Additionally, the connection surface 64 may include other structures for allowing engagement of an external load including slots, holes, clips or any other joining structure.

In one aspect and as best seen in FIGS. 1-3 and 7, the housing 32 may be formed of plastic and include a vessel having sides 34, a top 36, a bottom 38, and a bus member 40 adapted to receive a plurality of connections linking cells 35 of the battery module 30 and the at least one terminal 42. The bus member 40 may be disposed within the vessel. As stated above, the at least one terminal 42 may be ultrasonically or thermally attached to the bus member 40 or in another aspect may be attached to the bus member 40. The bus member 40 may include a safety vent 68 for releasing a pressure in the event of a short circuit or overcharging of the battery module 30. The safety vent 68 may be integrated with the bus member 40. The bus member 40 may include channels 70 allowing the pressurized gases of the various cells 35 to travel through the channels 70 to the safety vent 68 positioned on one end of the bus member 40.

Figure 16:
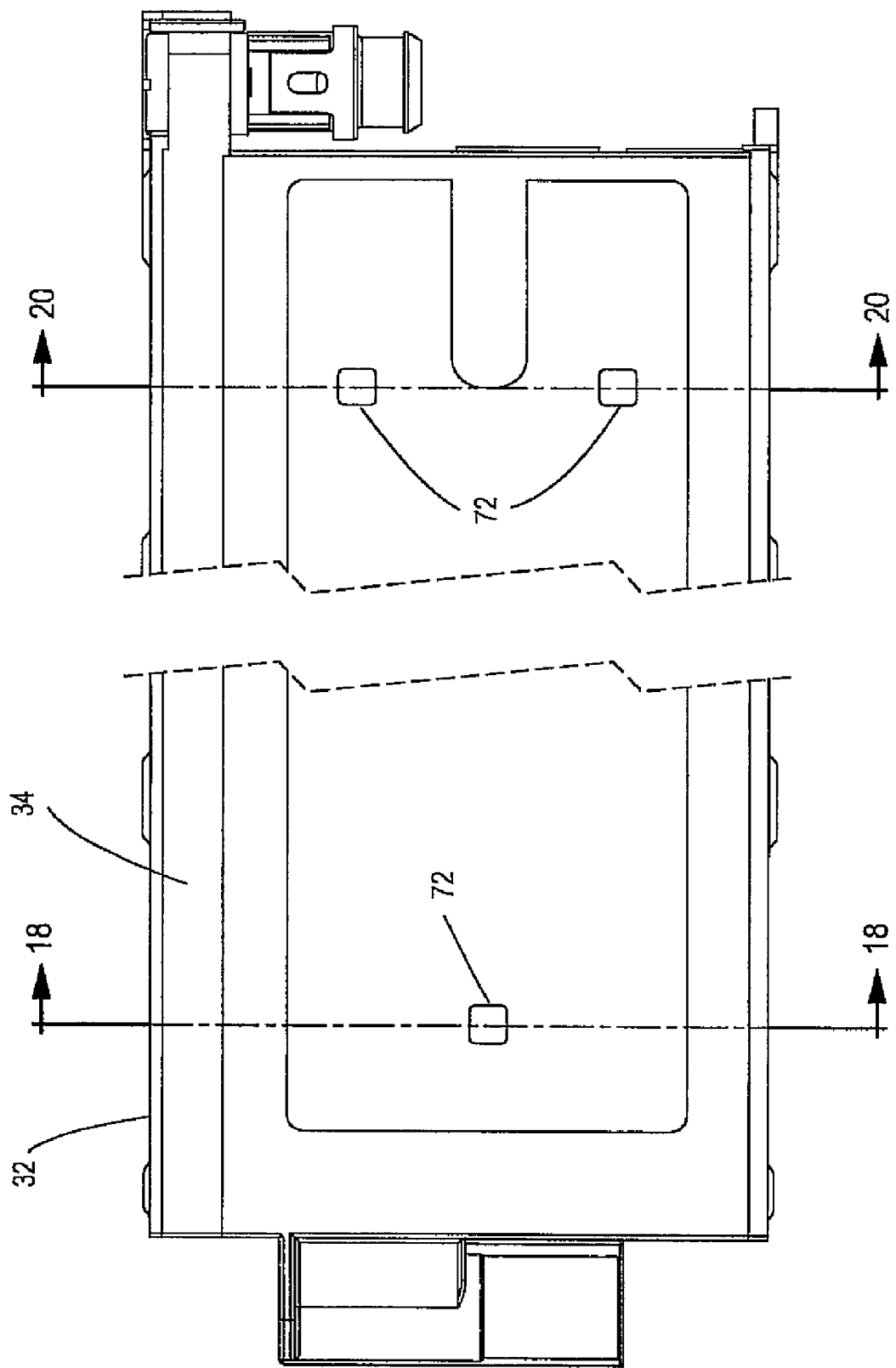
FIG. 16 is a partial side view of a battery module detailing male and female alignment features of the housing.
Figure 17:
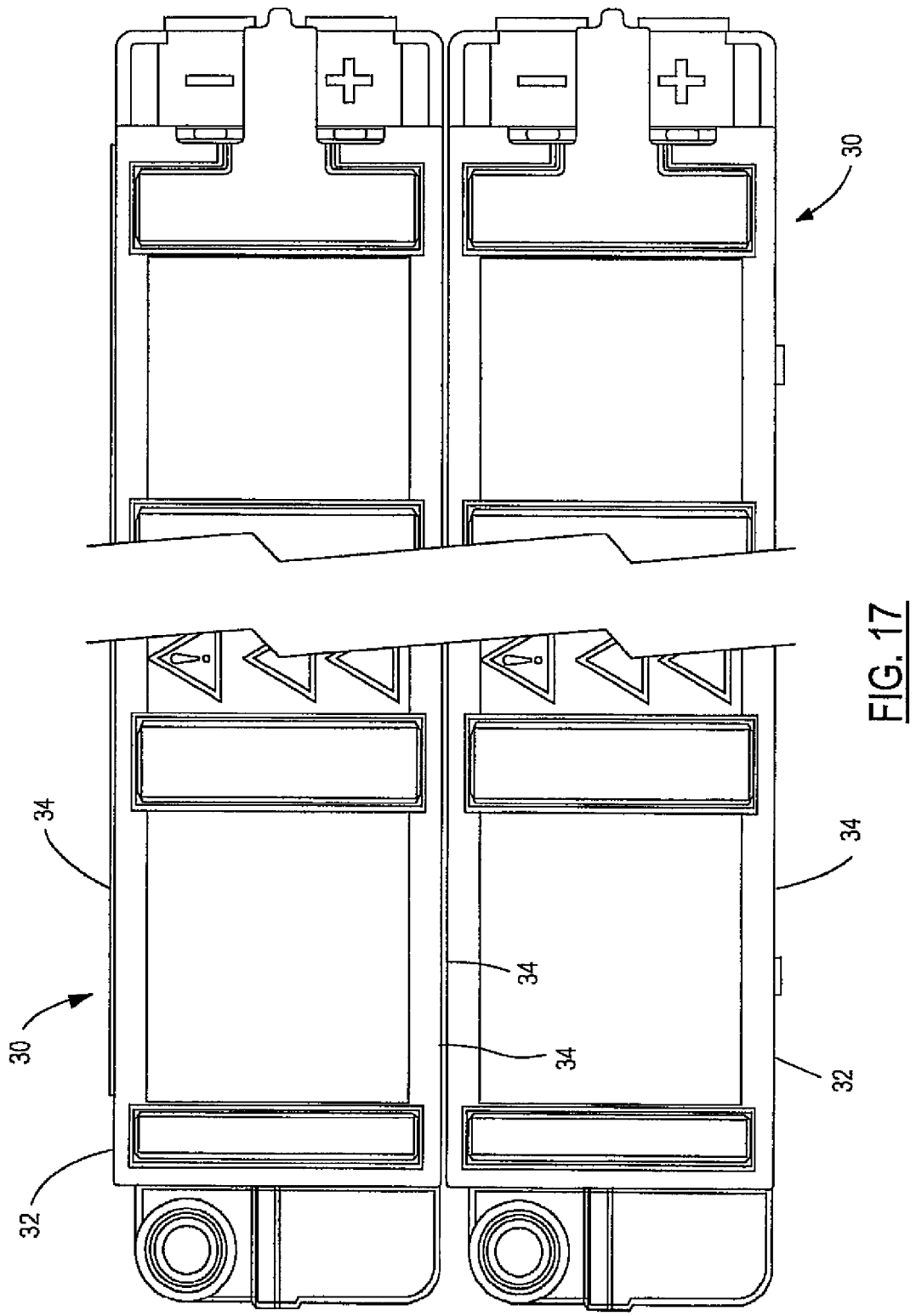
FIG. 17 is a sectional view of adjacent battery modules taken along the line 17-17 in FIG. 16.
Figure 18:
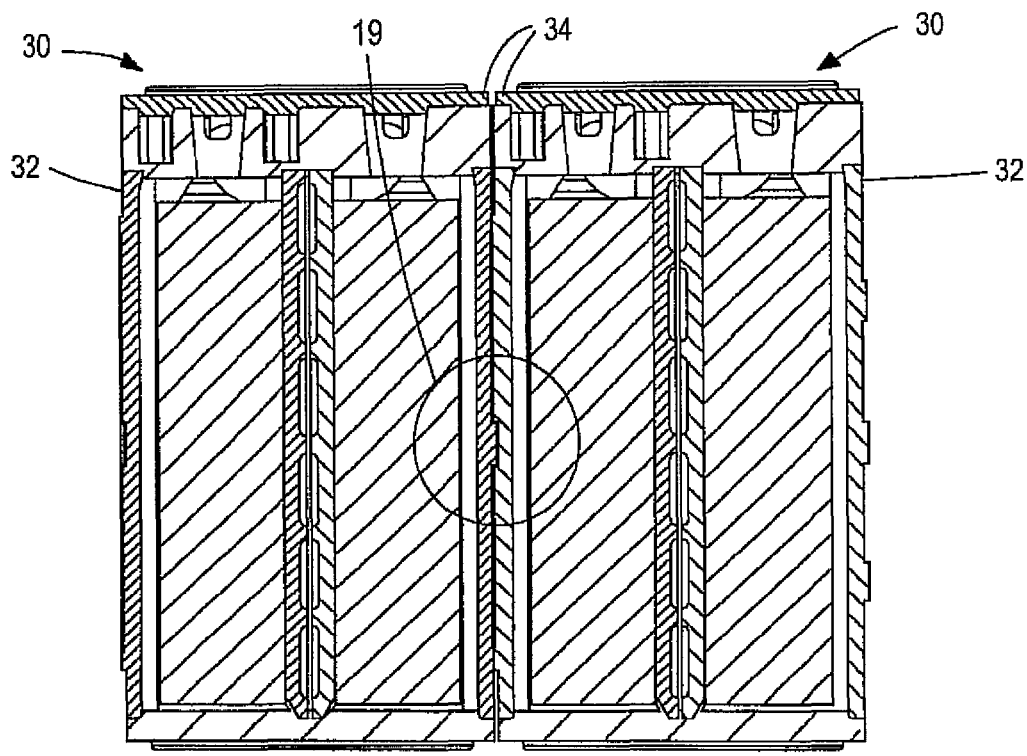
FIG. 18 is a partial sectional view of adjacent battery modules taken along the line 18-18 of FIG. 16.
Figure 19:
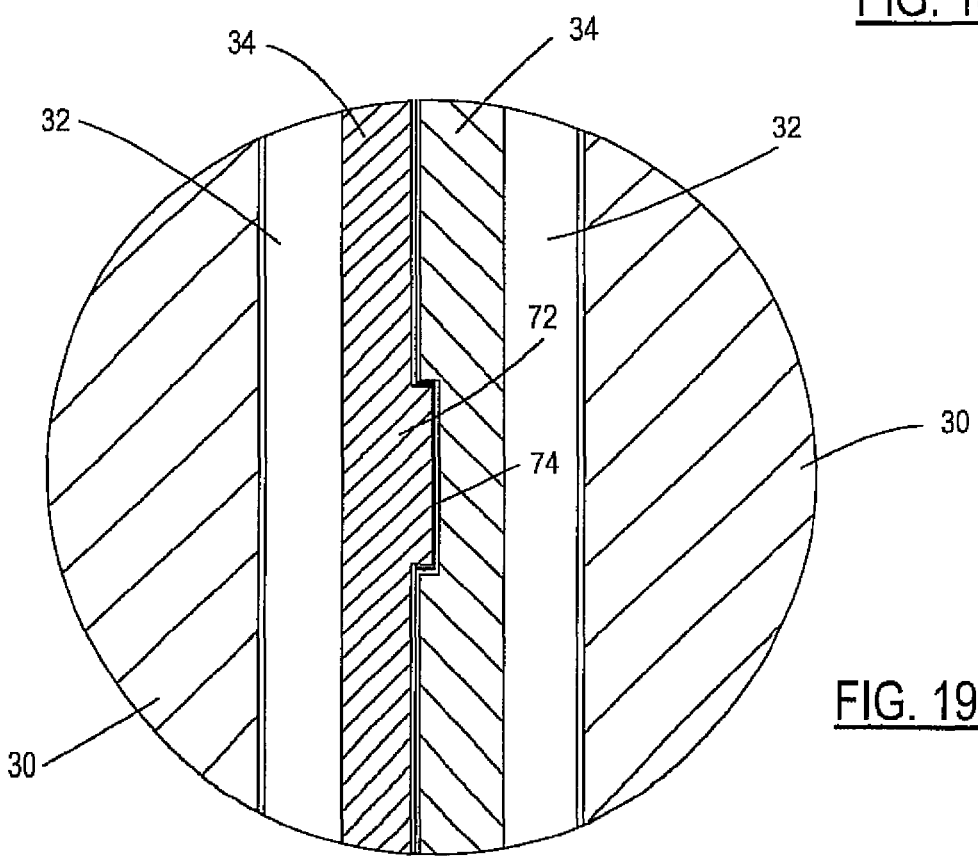
FIG. 19 is a detailed view of the male and female alignment features of adjacent battery modules shown in FIG. 18.

In one aspect, one of the sides 34 of the housing 32 as best shown in FIG. 16 may include a male alignment feature 72 and the other side 34 of the housing 32 may include a female alignment feature 74. As best seen in FIGS. 18 and 19, the male alignment feature 72 of one battery module 30 may be received in a female alignment feature 74 of an adjacent battery module 30 thereby aligning the modules 30 relative to each other providing a reliable positioning. The alignment of the battery modules 30 provides a uniform compression and spacing of the modules 30 improving the performance of the battery modules 30.

In one aspect and as shown in FIG. 22, at least one of the sides 34 may include a layered or composite structure. The layered structure may include plastic 76, plastic film 78, adhesive 80, aluminum 82 forming a permeability barrier. The layered structure controls transfer of materials through the sides 34 between the interior and exterior of The battery module 30. The plastic may be selected from the group consisting of polyphenylene ether, polystyrene, polypropylene, polyphenylene sulfide or any combination thereof.

Referring to FIGS. 20 and 21, the sides 34 of the housing 32 may include a spacing material 82. The spacing material 82 of one module 30 presses on an adjacent side 34 to provide a uniform compression and spacing of adjacent battery modules 30. In one aspect, the spacing material 82 extends a distance from the side 34 that is greater than two times a height of flash trimmed at a maximum tolerance level. The flash may be formed when joining the various components of the housing 32.

In one aspect, the at least one terminal 42 may be formed of nickel or a nickel based alloy. In an alternative aspect, the shank 44 of the at least one terminal 42 may be formed of an electrically conductive material which is corrosion resistant to an alkaline environment, such as nickel and the terminal portion 56 may be formed of an electrically conductive material having strong structural properties and sufficient corrosion resistance to the area external to the housing 40, such as iron copper material. The iron copper material may be a sintered iron material with copper dispersed therein. In one aspect, the dispersed copper may be present in an amount of from 20 to 25 percent by weight of the iron copper material.

As stated above, the battery module 30 includes a housing 32 and a plurality of cells 35 that is disposed in the housing 32. The cells 35 may be electrically coupled via bus bars integrated into the bus member 40. Each of the cells 35 includes a plurality of negative and positive electrodes 84, 86 that are spaced by a separator 88. The negative electrode 84 includes a substrate 90 having a tab 92 meeting at a flange 94 that is connected to an active material portion of the electrode. In one aspect, the substrate 90 may be formed of perforated nickel plated steel. The active material may be a paste of $AB_5$ hydride alloy applied to the active material portion wherein A is selected from La, Ce, Ti, and Mischmetal and B is selected from Ni, Co, Mn, and Al. The flange 94 formed on the negative electrode 84 is sized to minimize voltage drops across the electrode. Additionally, the flange 94 improves the current distribution across the electrode compared to prior art electrodes.

Similar to the negative electrodes 84 described above, the positive electrode 86 also includes a substrate 98 having a tab 100 meeting at a flange 102 that is connected to an active material portion of the electrode. The positive electrode 86 may have a substrate that is formed of nickel foam. The active material may be a paste of a nickel hydroxide and other materials. As with the flange 94 of the negative electrode 84, the positive electrode flange 102 is sized to minimize voltage drops and improve the current distribution across the electrode in comparison to prior art electrodes.

As stated above, the terminal 42 may be melt joined with the bus member 40 sealing the terminal 42 relative to the bus member 40 and providing a conductive path to an interior of the battery module 30. The terminal 42 may be melt joined using an ultrasonic joining operation. In the ultrasonic joining operation, an appropriate fixture may be utilized to secure the battery module 30. The fixture clamps securely on the bus member 40. The o-rings 48, 54 may be positioned on the terminal 42 as described above and tar 50 may also be positioned on the terminal 42, as described above. An ultrasonic energy is applied to a localized area of the bus member 40 causing a localized melt of the material. The ultrasonic energy applied to the localized area may be approximately 20 kHz applied with a horn pressed against the terminal 42 at the surface 64. The terminal 42 is therein pressed into the bus member 40 such that the anti-pullout features 62, o-rings 48, 54, and knurled formations 60 engage with the bus member 40. Following insertion of the terminal 42, the part is allowed to cool forming a sealed joining of the terminal 42 relative to the bus member 40.

Again as stated above, the terminal 42 may be melt joined in a thermal insertion operation. The terminal 42 may be heated with an induction heating coil surrounding the terminal portion 56 until the melt temperature of the plastic is achieved at the knurled surface 58. The terminal 42 is inserted and pressed into the bus member 40 and secured in place until the plastic surrounding the surface 58 hardens to secure the position of the terminal 42 within the bus member 40.

The invention has been described in an illustrative manner. It is to be understood that the terminology which has been used is intended to be in the nature of words of description rather than limitation. Many modifications and variations of the invention are possible in light of the above teachings. Therefore, within the scope of the appended claims, the invention may be practiced other than as specifically described.

The invention claimed is:

1. A battery module comprising:
 a housing having a bus member;
 at least one terminal melt joined with the bus member sealing the terminal relative to the bus member and providing a conductive path to an interior portion of the housing, wherein the at least one terminal includes a shank adapted to interact with said bus member, the shank extending longitudinally to a transition portion.

2. The battery module of claim 1 wherein the terminal is melt joined in an ultrasonic joining operation.

3. The battery module of claim 1 wherein the terminal is melt joined in a thermal insertion operation.

4. The battery module of claim 1 wherein the shank includes a first o-ring disposed thereon for sealing relative to the bus member when the terminal is joined to the housing.

5. The battery module of claim 1 wherein the shank includes a viscous material disposed thereon, the viscous material providing a barrier between the terminal and housing.

6. The battery module of claim 1 wherein the transition portion includes a channel receiving a second o-ring for sealing the terminal relative to the housing.

7. The battery module of claim 6 including a terminal portion extending longitudinally from the transition portion, the terminal portion including an outer surface having knurled formations providing an anti-rotation when joined to the bus member.

8. The battery module of claim 7 wherein the outer surface of the terminal portion includes anti-pullout formations formed thereon.

9. The battery module of claim 7 wherein the terminal portion stops at a connection surface adapted to connect to an external load.

10. The battery module of claim 9 wherein the connection surface includes a threaded portion adapted to connect to the external load.

11. The battery module of claim 1 wherein the housing is formed of plastic selected from the group consisting of polyphenylene ether, polystyrene, polypropylene, polyphenylene sulfide and any combination thereof.

12. The battery module of claim 1 wherein the housing is a vessel having sides, a top a bottom and said bus member adapted to receive a plurality of connections linking cells of the battery module and the at least one terminal, the bus member disposed within the vessel.

13. The battery module of claim 12 wherein the at least one terminal is ultrasonically or thermally attached to the bus member.

14. The battery module of claim 12 including a safety vent for releasing a pressure in the event of a short circuit or overcharging of the battery module.

15. The battery module of claim 12 wherein one of the sides includes a male alignment feature and the other side includes a female alignment feature adapted to mate with each other.

16. The battery module of claim 12 wherein at least one of the sides includes a layered structure of plastic, plastic film, adhesive, aluminum, adhesive and a plastic film forming permeability barrier.

17. The battery module of claim 12 wherein the side members include a spacing material.

18. The battery module of claim 17 wherein the spacing material of one module presses on an adjacent side to provide a uniform compression and spacing.

19. The battery module of claim 12 wherein one of the sides of the housing includes a thermocouple for monitoring a temperature of the battery module.

20. The battery module of claim 1 wherein the at least one terminal is formed of nickel.

21. The battery module of claim 1 wherein the shank is formed of nickel and the terminal portion is formed of an iron copper material joined together.

22. The battery module of claim 21 wherein the iron copper material is a sintered iron material with copper dispersed therein.

23. The battery module of claim 22 wherein the dispersed copper is present in an amount of from 20 to 25 percent by weight of the iron copper material.

* * * * *

UNITED STATES PATENT AND TRADEMARK OFFICE
CERTIFICATE OF CORRECTION

PATENT NO. : 8,105,709 B2  
APPLICATION NO. : 12/191582  
DATED : January 31, 2012  
INVENTOR(S) : John V. Hellmann It is certified that error appears in the above-identified patent and that said Letters Patent is hereby corrected as shown below:

In the Specifications

Column 3, line number 58, delete "The", insert --the--.

Column 4, line number 51, delete "tar 50", insert --viscous bonding layer 50, such as tar--.

In the Claims

Column 6, line number 9, Claim 12, after top, insert --,--.

Signed and Sealed this  
Thirtieth Day of April, 2013

Teresa Stanek Rea  
*Acting Director of the United States Patent and Trademark Office*